(12) United States Patent
Kuhn et al.

(10) Patent No.: US 6,607,309 B2
(45) Date of Patent: Aug. 19, 2003

(54) OPTICAL DEVICE

(75) Inventors: Gerhard Kuhn, Köfering (DE); Hans-Ludwig Althaus, Lappersdorf (DE); Alfred Rast, Regenstauf (DE); Wolfgang Gramann, Regensburg (DE); Michael Sailer, Rettenbach (DE); Hubert Schmid, Painten (DE); Markus Wicke, Zappersdorf (DE); Sven Weber-Rabsilber, Regensburg (DE); Wilhelm Karsten, Regensburg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/873,079

(22) Filed: Jun. 1, 2001

(65) Prior Publication Data

US 2002/0181903 A1 Dec. 5, 2002

(51) Int. Cl.⁷ ................................................ G02B 6/42
(52) U.S. Cl. .................................... 385/93; 385/88
(58) Field of Search .................... 385/140, 93, 92, 385/88, 89, 90, 33, 91, 94

(56) References Cited

U.S. PATENT DOCUMENTS

| | | | | |
|---|---|---|---|---|
| 4,807,954 A | * | 2/1989 | Oyamada et al. | 385/33 |
| 5,015,057 A | * | 5/1991 | Rumbaugh et al. | 252/299.01 |
| 5,309,542 A | * | 5/1994 | Strope et al. | 385/140 |
| 5,696,862 A | * | 12/1997 | Hauer et al. | 385/14 |
| 6,061,493 A | * | 5/2000 | Gilliland et al. | 385/140 |
| 6,071,017 A | * | 6/2000 | Gilliland et al. | 385/88 |
| 6,283,644 B1 | * | 9/2001 | Gilliland et al. | 385/193 |

\* cited by examiner

*Primary Examiner*—Ricky Mack
*Assistant Examiner*—Omar Hindi
(74) *Attorney, Agent, or Firm*—Laurence A. Greenberg; Werner H. Stemer; Ralph E. Locher

(57) ABSTRACT

An optical device includes a surface-mountable optical component with a base member having a recess filled with a transparent filler and a VCSEL element arranged in the recess. A receptacle is attached to the surface-mountable optical component. The receptacle is for receiving an optical fiber to optically connect the VCSEL element to the optical fiber. Accordingly, an inexpensive way of coupling a VCSEL element with an optical fiber is provided. In particular, the surface-mountable component can be produced using a high volume production so that the overall costs of the optical device are reduced, even if the receptacle is produced in lower numbers due to varying requirements in the way that the VCSEL will be coupled to an optical fiber.

18 Claims, 4 Drawing Sheets

OPTICAL DEVICE

BACKGROUND OF THE INVENTION

Field of the Invention

The present invention relates to an optical device.

A Vertical Cavity Surface Emitting Lasers (VCSEL) is a semiconductor microlaser diode that emits light in a cylindrical beam vertically from the surface of a fabricated wafer. VCSELs offer significant advantages when compared to the edge-emitting lasers still used in the majority of fiber optic communications devices. To this end, VCSELs are packaged in TO (Transistor Outline) metal housings and mounted in receptacles for coupling with optical fibers.

In WO 9931737, which is hereby incorporated by reference, there is described a method for producing a surface-mounted optoelectronic component. The component provides good optical characteristics while being inexpensive.

It would be desirable to provide an inexpensive way of coupling VCSELs to optical fibers. The present invention aims to address this desire.

SUMMARY OF THE INVENTION

According to one aspect of the invention there is provided an optical device comprising: a surface-mountable optical component comprising a base member having a recess filled with a transparent filler, and an VCSEL element arranged in the recess; and a receptacle attached to the surface-mountable optical component, for receiving an optical fiber, thereby to optically connect the VCSEL element with the optical fiber. Accordingly, there is provided an inexpensive way of coupling a VCSEL element with an optical fiber. In particular, the surface-mountable component is suitable for a high volume production so that the overall costs of the optical device are reduced, even if the receptacle is produced in lower numbers due to varying requirements in the way the VCSEL is to be coupled to an optical fiber.

Preferably, the surface-mountable optical component further comprises one or more optoelectronic monitor elements arranged in the recess of the base member, for monitoring a predetermined emission parameter of the light emitter. The predetermined emission parameter may be, for example, the light emission power. Thus, the perfomance of the VCSEL can be monitored and any necessary corrections made.

In one embodiment of the invention, the optical device further comprises a reflector arranged between the light emitter and a light receiving end of the receptacle, for reflecting a part of the light emitted by the VCSEL onto at least one of the one or more optoelectronic monitor elements. This facilitates the arrangement of the monitor elements.

Preferably, the light emitter and the one ore more optoelectronic elements are mounted to a bottom surface of the recess adjacent to one another, and the reflecting surface of the reflector is at an angle relative to the bottom surface of the recess thereby to reflect light emitted from the light emitter onto at least one of the one or more optoelectronic monitor elements. This further simplifies the design of the optical device.

In one embodiment of the invention, the surface of the reflector facing the light receiving end of the receptacle is convex. Thereby, light emitted from the VCSEL is focussed onto the light-receiving end surface of an optical fiber received in the receptacle.

Preferably, the receptacle comprises an optical coupling element inbetween the optical fiber and the optoelectronic element, for focussing light from the VCSEL element onto the light receiving end surface of an optical fiber received in the receptacle. Thereby, the optical characteristics of the coupling of the VCSEL and the optical fiber are further improved.

The optical coupling element comprise a lens. The receptacle may comprise a recess for holding the lens. The lens may be spherical. This provides for a simple design while achieving a reliable optical coupling.

Preferably, the optical coupling element is in contact with the filler. This provides for an exact alignment of the VCSEL and the optical coupling element.

In one embodiment of the invention, the light receiving end portion of the receptacle is transparent to optically connect the VCSEL element with the optical fiber, wherein part of the surface of the transparent end portion facing the VCSEL, and/or part of the surface of the transparent end portion facing the light receiving end surface of an optical fiber received in the receptacle, is convex, thereby to form the optical coupling element.

In one embodiment of the invention, the receptacle comprises an optical coupling element inbetween the optical fiber and the VCSEL element, for focussing light emitted from the VCSEL element onto the light receiving end surface of an optical fiber, wherein the surface of the optical coupling element facing the VCSEL element is reflective to reflect part of the light emitted from the VCSEL element on at least one of the one or more optoelectronic monitor elements. Thus, no separate reflector is required while still allowing a simple arrangement of the monitor elements.

The optical device may further comprise an attachment element through which the surface-mountable optical component is attached to the receptacle, the attachment element comprising a through hole, wherein the surface-mountable optical component is arranged at one end of the through hole, and the receptacle is arranged at the other end of the through hole, whereby the VCSEL element is optically connected to an optical fiber received in the receptacle. By means of an attachment element, the design of the end portion of the receptacle for attachment with the surface-mountable optical element, and vice versa, is less restricted. Thus, pre-manufactured surface-mountable optical elements and receptacles can be attached to one another without requiring an adaptation of their design.

Preferably, the receptacle and the surface-mountable optical component are glued to opposing surfaces of the attachment element, respectively. This further reduces manufacturing costs.

In one embodiment, the optical device further comprises a reflector arranged between the VCSEL element and a light receiving end of the receptacle, for reflecting a part of the light emitted by the VCSEL element onto at least one of the one or more optoelectronic monitor elements; and an attachment element through which the surface-mountable optical component is attached to the receptacle, the attachment element comprising a through-hole, wherein the surface-mountable optical compenent is arranged at one end of the through hole, and the receptacle is arranged at the other end of the through hole, whereby the optoelectronic element is optically connected to the optical fiber, and wherein the reflector is held in the through hole.

The receptacle may comprise plastic, metal and/or ceramic material. The optical coupling element may comprise transparent plastic and/or glas material.

The filler may comprise a hardenable sealing compound. In particular, the filler may comprise epoxy resin.

According to another aspect of the invention, there is provided a surface-mountable optical component comprising a base member having a recess filled with a transparent filler, and a VCSEL arranged in the recess. Accordingly, a simple and inexpensive surface-mountable VCSEL component is provided which is suitable for high volume production.

DESCRIPTION OF THE PREFERRED EMBODIMENT

Figure 1:
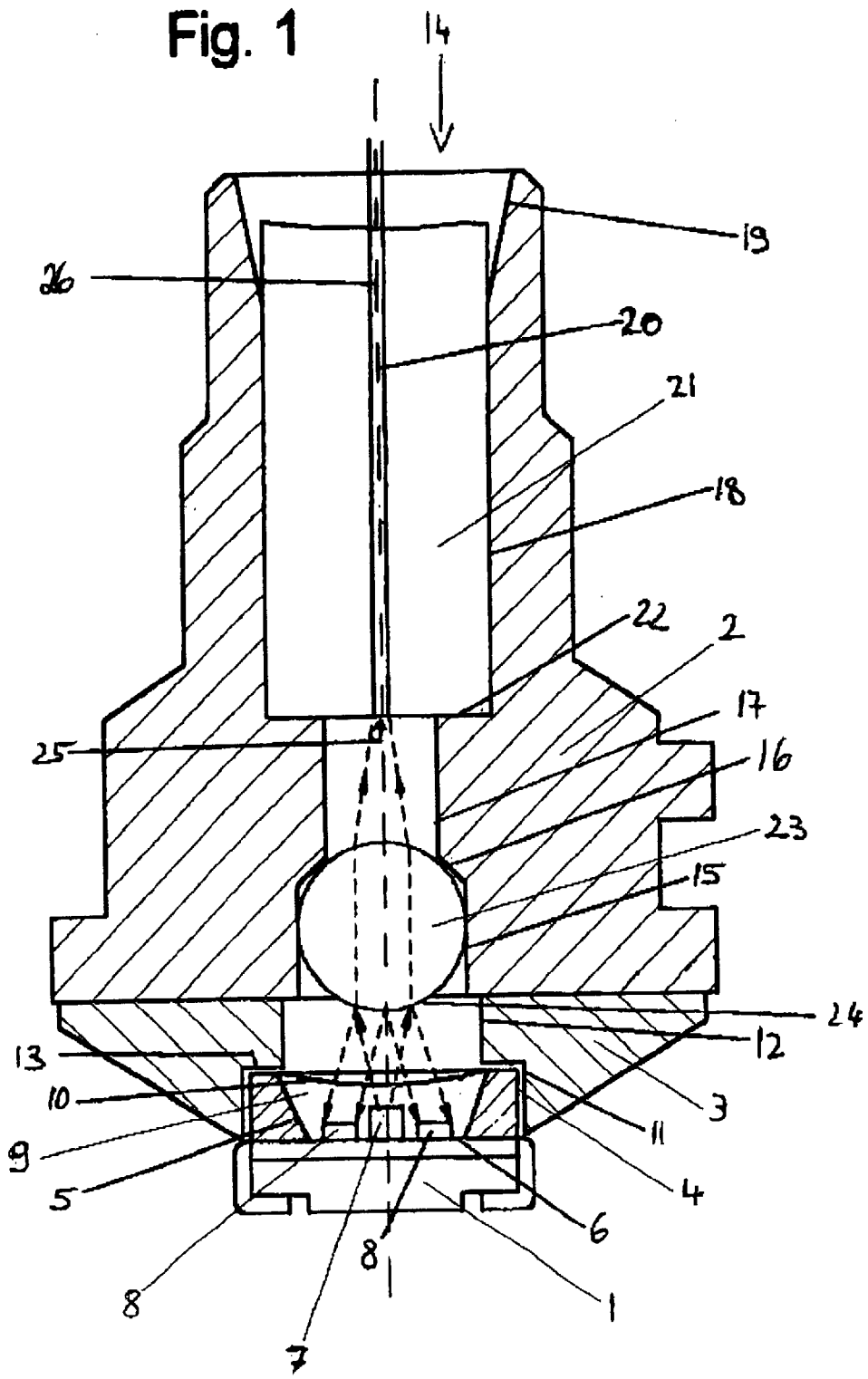
FIG. 1 is a sectional view of an optical device according to a first embodiment of the invention.

Referring now to FIG. 1, there is shown a sectional view of an optical device according to a first embodiment of the invention. The optical device comprises a surface-mountable optical component 1 which is attached to a receptacle 2 by means of an attachment element 3.

The surface-mountable optical component 1 comprises a base portion 4 with a recess 5. On a bottom surface 6 of the recess 5, a VCSEL 7 is provided inbetween monitor diodes 8. The recess is filled with a transparent hardenable filler 9. A top surface 10 of the hardened filler 9 is concave.

The attachment element 3 comprises two bores 11 and 12. The first bore 11 has a diameter corresponding to the outer diameter of the surface-mountable component 1. The second bore 12 has a diameter smaller than that of the first bore 11, so that a step 13 is formed where the two bores 11 and 12 adjoin. The component 1 is received in the first bore 11 and comes to sit on the step 13. Preferably, the component is glued to the attachment element 3. The receptacle 2 is glued to the opposing end of the attachment element 3.

The receptacle 2 comprises a through hole 14 consisting of portions 15–19. Portions 15, 17 and 18 are cylindrical and have different diameters. Portions 16 and 19 are conical. An optical fiber 20 is embedded in a ferrule 21 which has the same diameter as the cylindrical portion 18. The ferrule 21 is inserted into the portion 18 and thereby held in the receptacle 2. The conical portion 19 facilitates insertion of the ferrule 21 into the cylindrical portion 18. Since the cylindrical portion 17 adjoining the cylindrical portion 18 has a smaller diameter, another step 22 is formed on which the ferrule 21 comes to sit when inserted into the cylindrical portion 18.

A spherical lens 23 is received in the cylindrical portion 15. The lens 23 of this embodiment is spherical, has the same diameter as the cylindrical portion 15 and abuts on the walls of the spherical portion 16. The lens 23 is held by the walls of the cylindrical portion 15 but can be glued therto additionally. The lens 23 projects from the lower exit (i.e. the exit facing the component 1) into the second bore 12.

As shown, the lens 23 is at a distance from the upper surface of the surface-mountable optical component 1. A surface 24 of the lens 23 facing the component 1 is reflective so that part of the light emitted from the VCSEL 7 and impinging on the surface 24 is reflected back onto the monitor diodes 8, as shown by arrows A. The other part of the light passes through the lens 23 and is thereby focussed onto a light-receiving end of the optical fiber 20 which is at a distance from the lens 23.

When assembled, the component 1, the attachment element 3 and the receptacle 2 form an axis 26 which passes through the center of the VCSEL 7, the center of the lens 23, and along the optical axis of the optical fiber 20.

Figure 2:
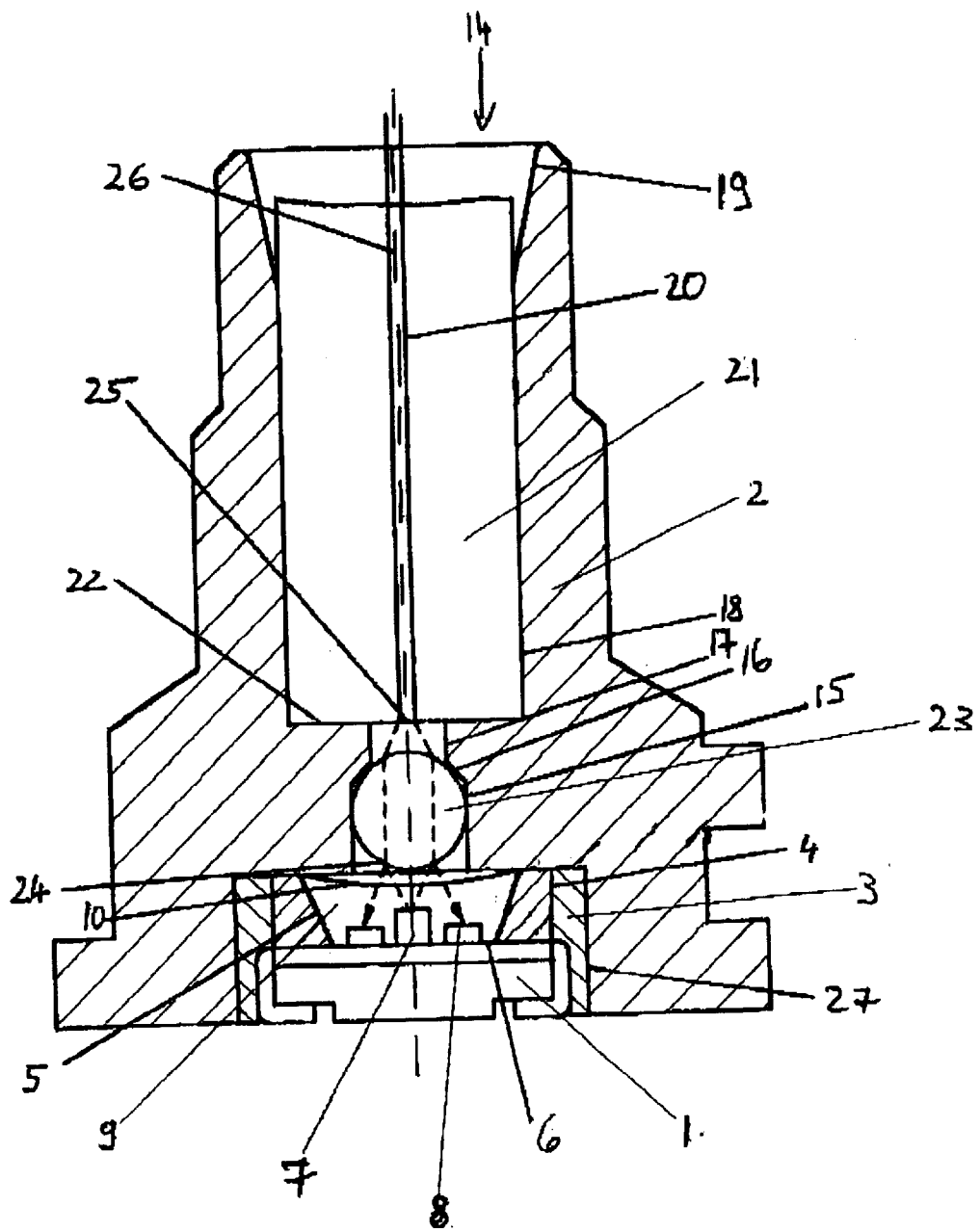
FIG. 2 is a sectional view of an optical device according to a second embodiment of the invention.

FIG. 2 illustrates a second embodiment of the invention. Same reference numbers designate the same elements as shown in FIG. 1 so that a description of these elements is omitted.

In this embodiment, the attachment element 3 and the component 1 are received within a cylindrical portion 27 and thereby held in the receptacle 2. The cylindrical portion 27 has the same diameter as the attachment element 3. Also, the attachment element 3 and the component 1 have the same longitudinal extension. Preferably, the outer walls of the attachment element 1 are glued to the walls of the cylindrical portion 27. The axial extension of the cylindrical portion 27 (i.e. the extension along the axis 26) corresponds to that of the attachment element 3 and component 1 so that the component 1 is completely received within the cylindrical portion 27, and the bottom surface (i.e. the surface of the component 1 which is to be mounted to a component receiving surface) of the component 1 and the attachment element 3 forms an even surface with the bottom surface of the receptacle 2. This is in contrast to the first embodiment, where part of the component 1 projects from the attachment element 3.

In FIG. 2, the lens is at close distance from the concave top surface 10 of the hardened filler 9. Although not shown, the lens 23 may also be in direct contact with the surface 10 in an alternative embodiment.

Figure 3:
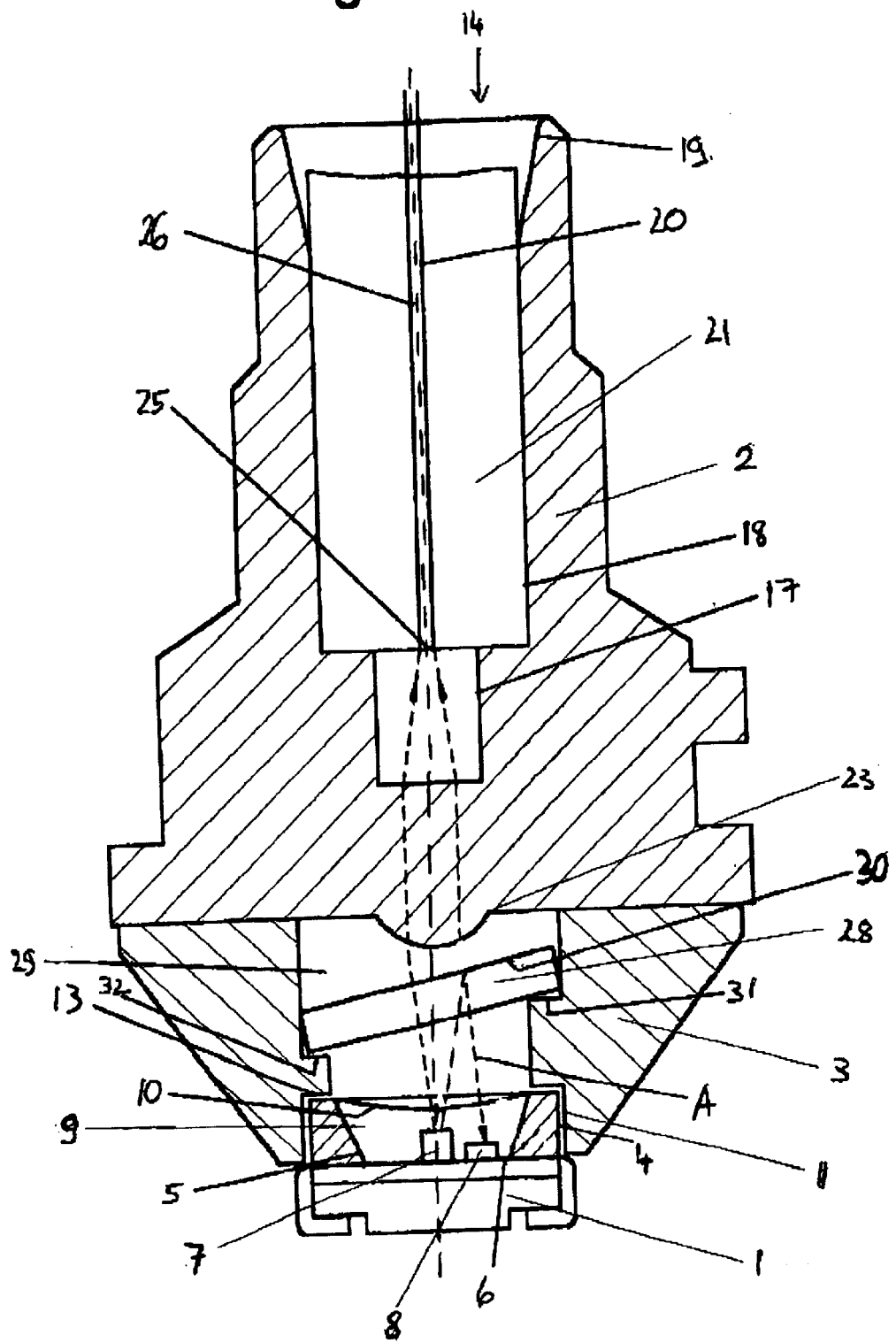
FIG. 3 is a sectional view of an optical device according to a third embodiment of the invention.

FIG. 3 illustrates a third embodiment of the invention. Again, a description of elements corresponding to those of the first and second embodiments is omitted.

In FIG. 3, the surface-mountable optical component 1 is attached to the receptacle 2 by means of an attachment element 3. However, in contrast to the first embodiment, the lens 23 is integrated into receptacle 2. That is, receptacle 2 is formed of a transparent material. Part of the bottom surface of the receptacle (i.e. the surface facing the component 1) at the axis 26 is convex. The portions 15 and 16 of the through hole 14 are omitted. The integrated lens 23 has the same function as in the first and second embodiments, that is to focus light emitted from the VCSEL 7 onto the light receiving surface 25 of the optical fiber 20.

In addition, a transparent reflective element 28 is provided within a through hole 29 through the attachment element 3. The reflective element has a reflective surface 30 facing the component 1. Of the light emitted from the VCSEL 7, one part is reflected back onto the monitor diode 8, while the other part passes through the reflective element 28 to the lens 23. The reflective element 28 is mounted to steps 31 and 32 within the through hole 29. The steps 31 and 32 are provided at different positions along the axis 14. That is, in the orientation of FIG. 3, the step 31 is located higher (closer to the receptacle) than the step 31 (which is closer to the component 1). As a consequence, the reflective surface 30 is at an angle relative to the upper surface of the component 1. Thus, light emitted from the VCSEL 7 and impinging onto the reflective surface 30 is not reflected back onto the VCSEL 7, but onto the monitor diode 8 located adjacent to the VCSEL 7 on the bottom surface 6 of the recess 5. Only a single monitor diode 8 is provided, compared to the first and second embodiments.

Figure 4:
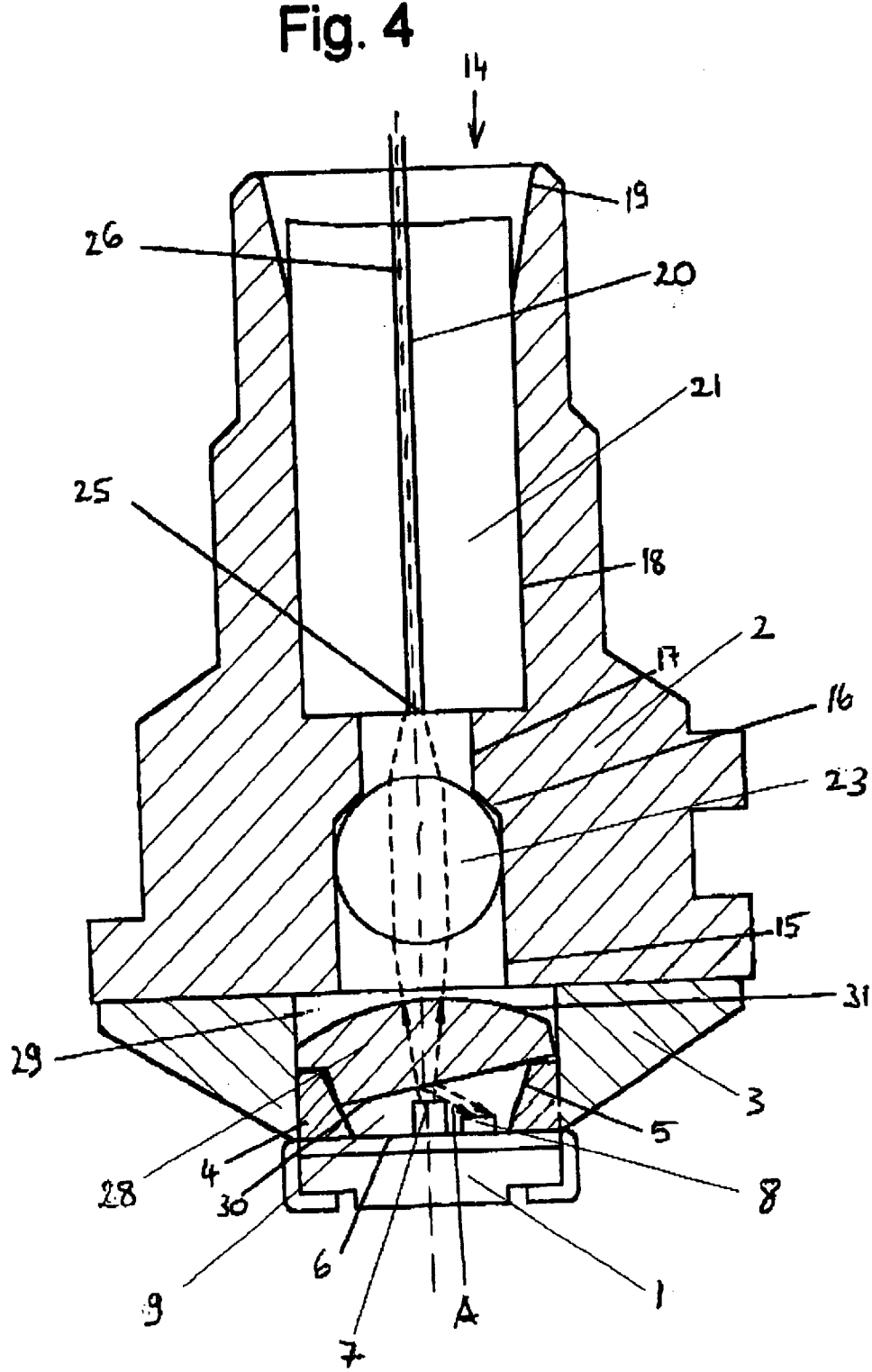
FIG. 4 is a sectional view of an optical device according to a fourth embodiment of the invention.

FIG. 4 illustrates a fourth embodiment of the invention. In this embodiment, the through hole 29 is formed by a single bore through the attachment element 3. The reflective member 28 is attached to the rim of the recess 5. Part of the reflective member 28, and in particular part of the reflective surface 30 extends into the filler 9. The reflective member 28 is shaped such that the reflective surface 30 is at an angle relative to the upper surface of the component 1. Thus, light emitted from the VCSEL 7 and impinging onto the reflective surface 30 is not reflected back onto the VCSEL 7, but onto the monitor diode 8 located adjacent to the VCSEL 7 on the bottom surface 6 of the recess 5. Again, only a single monitor diode 8 is provided.

Opposite the reflective surface 30, the reflective element 28 comprises a convex surface 33. As a consequence, light from the VCSEL 7 passing through the reflective element 28 is pre-focussed onto the lens 23 when exiting the reflective element 28.

The lens 23 corresponds to that of the first embodiment, although it is arranged further away from the component 1, closer to the optical fiber 20. This is achieved by an longitudinal extension of the cylindrical portion 17 and a shortening of the cylindrical portion 15. The lens 23 thus no longer projects from the lower exit of the through hole 14.

We claim:

1. An optical device, comprising:

an optical fiber having a light-receiving end surface;

a surface-mountable optical component including a base member formed with a recess, vertical cavity surface emitting laser (VCSEL) element located in said recess, said VCSEL element emitting light, said VCSEL element having a predetermined emission parameter, at least one optoelectronic monitoring element disposed in said recess, said at least one optoelectronic monitoring element monitoring said predetermined emission parameter, said recess being filled with a transparent filler; and a receptacle for receiving said optical fiber and for optically connecting said optical fiber with said VCSEL element, said receptacle being attached to said surface-mountable optical component, said receptacle including an optical coupling element disposed between said optical fiber and said VCSEL element for focusing the light emitted from said VCSEL element onto said light-receiving end surface of said optical fiber, said optical coupling element having a surface facing said VCSEL element, said surface being reflective to reflect part of the light emitted from said VCSEL element on said at least one optoelectronic monitoring element.

2. The optical device according to claim 1, wherein:

said VCSEL element emits light with a power; and said predetermined emission parameter is said power of said light.

3. An optical device, comprising:

an optical fiber;

a surface-mountable optical component including a base member formed with a recess, vertical cavity surface emitting laser (VCSEL) element located in said recess, said VCSEL element being optically connected to said optical fiber, said VCSEL element emitting light said VCSEL element having a predetermined emission parameter at least one optoelectronic monitoring element disposed in said recess, said at least one optoelectronic monitoring element monitoring said predetermined emission parameter said recess being filled with a transparent filler;

a receptacle for receiving said optical fiber and for optically connecting said optical fiber with said VCSEL element, said receptacle being attached to said surface-mountable optical component, said receptacle having a light-receiving end, a reflector disposed between said VCSEL element and said light receiving end of said receptacle for reflecting a portion of the light emitted by said VCSEL element onto said at least one optoelectronic monitoring element; and an attachment element attaching said surface-mountable optical component to said receptacle, said attachment element being formed with a through-hole defining a first end and a second end, said surface-mountable optical component being disposed at said first end of through-hole, said receptacle being disposed at said second end of said through hole, and said reflector being held in said through-hole in said attachment element.

4. An optical device, comprising:

an optical fiber;

a surface-mountable optical component including a base member formed with a recess, a vertical cavity surface emitting laser (VCSEL) element located in said recess, said VCSEL element emitting light, said VCSEL element having a predetermined emission parameter, at least one optoelectronic monitoring element disposed in said recess, said at least one optoelectronic monitoring element monitoring said predetermined emission parameter, said recess being filled with a transparent filler;

a receptacle for receiving said optical fiber and for optically connecting said optical fiber with said VCSEL element, said receptacle being attached to said surface-mountable optical component, said receptacle having a light-receiving end; and a reflector for reflecting part of the light emitted by said VCSEL element onto said optoelectronic monitoring element, said reflector disposed between said VCSEL element and said light-receiving end of said receptacle.

5. The optical device according to claim 4, wherein:

said recess of said base member is formed with a bottom surface;

said VCSEL element and paid optoelectronic monitoring element are mounted adjacent to each other on said bottom surface of said recess;

said reflector has a reelecting surface configured at an angle relative to said bottom surface of said recess to reflect the light emitted by said VCSEL element onto said optoelectonic monitoring element.

6. The optical device according to claim 4, wherein:

said reflector has a surface facing said light receiving end of said receptacle; and said surface of said reflector facing said light receiving end of said receptacle is convex.

7. An optical device, comprising:

an optical fiber having a light-receiving end surface, a surface-mountable optical component including a base member formed with a recess, a vertical cavity surface emitting laser (VCSEL) element located in said recess, said VCSEL element emitting light, said VCSEL element having a predetermined emission parameter, at least one optoelectronic monitoring element disposed in said recess, said at least one optoelectronic monitoring element monitoring said predetermined emission parameter, said recess being filled with a transparent filler;

an optical coupling element disposed between said optical fiber and said VCSEL element, said optical coupling element focusing the light emitted from said VCSEL element onto said light-receiving end surface of the optical fiber; and a receptacle for receiving said optical fiber and for optically connecting said optical fiber with said VCSEL element, said receptacle being attached to said surface-mountable optical component, said receptacle having a transparent light-receiving end portion for optically connecting said VCSEL element with said optical fiber received in said receptacle, said light-receiving end portion having a convex surface forming said optical coupling element.

8. The optical device according to claim 7, wherein said optical coupling element includes a lens.

9. The optical device according to claim 8, wherein said receptacle is formed with a recess for holding said lens.

10. The optical device according to claim 8, wherein said lens is spherical.

11. The optical device according to claim 7, wherein said optical coupling element contacts said filler.

12. The optical device according to claim 7, wherein said surface of said light receiving end portion faces said VCSEL element.

13. The optical device according to claim 7, wherein said surface of said light-receiving end portion faces the light-receiving end surface of the optical fiber.

14. The optical device according to claim 9, wherein said optical coupling element includes a material selected from the group consisting of transparent plastic and glass material.

15. An Optical device, comprising:

an optical fiber, a surface-mountable optical component including a base member formed with a recess, a vertical cavity surface emitting laser (VCSEL) element located in said recess, said VCSEL element having a predetermined emission parameter, at least one optoelectronic monitoring element disposed in said recess, said at least one optoelectronic monitoring element monitoring said predetermined emission parameter, said recess being filled with a transparent filler, said at least one optoelectronic element being optically connected to said optical fiber;

a receptacle for receiving said optical fiber and for optically connecting said optical fiber with said VCSEL element, said receptacle being attached to said surface-mountable optical component; and an attachment element attaching said surface-mountable optical component to said receptacle, said attachment element being formed with a through hole defining a first end and a second end, said surface-mountable optical component disposed at said first end of said through-hole, said receptacle being disposed at said second end of said through hole, said attachment element having a first surface glued to said receptacle, said attachment element having a second surface opposite said first surface and glued to said surface-mountable optical component.

16. The optical device according to claim 1, wherein said receptacle includes a material selected from the group consisting of a plastic material, a metal material and a ceramic material.

17. The optical device according to claim 1, wherein said filler includes a hardenable sealing compound.

18. The optical device according to claim 17, wherein said filler includes epoxy resin.

* * * * *